United States Patent
Kim

(10) Patent No.: US 8,780,265 B2
(45) Date of Patent: Jul. 15, 2014

(54) METHOD AND APPARATUS FOR CONVERTING FILM IMAGE INTO TV IMAGE

(71) Applicant: Core Logic Inc., Seoul (KR)

(72) Inventor: Sang Yeon Kim, Seoul (KR)

(73) Assignee: Core Logic Inc., Seoul (KR)

( * ) Notice: Subject to any disclaimer, the term of this patent is extended or adjusted under 35 U.S.C. 154(b) by 0 days.

(21) Appl. No.: 13/899,709

(22) Filed: May 22, 2013

(65) Prior Publication Data

US 2013/0314594 A1    Nov. 28, 2013

(30) Foreign Application Priority Data

May 23, 2012    (KR) .................. 10-2012-0054939

(51) Int. Cl.
*H04N 7/01*    (2006.01)

(52) U.S. Cl.
USPC .......................................... 348/441; 348/459

(58) Field of Classification Search
USPC ......... 348/441, 443, 446, 448, 458, 459, 558, 348/554
IPC ...................... H04N 5/46,7/01, 11/20
See application file for complete search history.

(56) References Cited

U.S. PATENT DOCUMENTS

| | | | |
|---|---|---|---|
| 7,173,669 B2* | 2/2007 | Choi | 348/459 |
| 2004/0046893 A1 | 3/2004 | Choi | |
| 2007/0285563 A1* | 12/2007 | Chen et al. | 348/441 |
| 2011/0007820 A1* | 1/2011 | Yim | 375/240.24 |

FOREIGN PATENT DOCUMENTS

| | | |
|---|---|---|
| JP | 2000295523 A | 10/2000 |
| JP | 2002077835 A | 3/2002 |
| KR | 1019948493 | 4/1994 |
| KR | 20040105967 A | 12/2004 |
| KR | 20070081848 A | 8/2007 |

* cited by examiner

*Primary Examiner* — Sherrie Hsia
(74) *Attorney, Agent, or Firm* — Lowe Hauptman & Ham, LLP

(57) ABSTRACT

Disclosed herein is a method and apparatus for converting a film image (e.g., a movie) into a television (TV) image. In the method and apparatus for converting the film image into a TV image, a pull-down field is added based on header information of a TV interface if BT601, BT656 and BT1120 are used as standards for the TV interface, thereby improving accuracy and reducing load of the apparatus upon conversion of the film image into the TV image. The apparatus includes a film image reception unit which receives a film image; a header information checking unit which checks header information of the film image; and an image conversion unit which uses the header information checked by the header information checking unit to convert the film image into the TV image.

6 Claims, 7 Drawing Sheets

Fig. 3

Bit assignment for video timing reference codes

| Word | Bit number | | | | | | | | | |
|------|---|---|---|---|---|---|---|---|---|---|
| | 9 (MSB) | 8 | 7 | 6 | 5 | 4 | 3 | 2 | 1 | 0 (LSB) |
| First | 1 | 1 | 1 | 1 | 1 | 1 | 1 | 1 | 1 | 1 |
| Second | 0 | 0 | 0 | 0 | 0 | 0 | 0 | 0 | 0 | 0 |
| Third | 0 | 0 | 0 | 0 | 0 | 0 | 0 | 0 | 0 | 0 |
| Fourth | 1 | F | V | H | $P_3$ | $P_2$ | $P_1$ | $P_0$ | 0 | 0 |

| Interlace and segmented frame system | Progressive system |
|---|---|
| F = 1 during field/segment No. 2 | F = 0 |
| = 0 during field/segment No. 1 | |
| V = 1 during field/segment blanking | V = 1 during frame blanking |
| = 0 elsewhere | = 0 elsewhere |
| H = 1 in EAV | H = 1 in EAV |
| = 0 in SAV | = 0 in SAV |

NOTE 1 – $P_0$, $P_1$, $P_2$, $P_3$ in the fourth word are the protection bits (see Table 15).

Fig. 7

| Frame number | Field change (·0→No change ·1→Change) | Field addition (·0→No addition ·1→Addition) | Accumulated value of field |
|---|---|---|---|
| 0 | 0 | 0 | 0 (=4x0) |
| 1 | 0 | 1 | 1 (=4x0+1) |
| 2 | 1 | 0 | 2 (=4x0+2) |
| 3 | 1 | 1 | 3 (=4x0+3) |
| 4 | 0 | 0 | 4 (=4x1) |
| 5 | 0 | 1 | 5 (=4x1+1) |
| 6 | 1 | 0 | 6 (=4x1+2) |
| 7 | 1 | 1 | 7 (=4x1+3) |
| 8 | 0 | 0 | 8 (=4x2) |
| 9 | 0 | 1 | 9 (=4x2+1) |
| ⋮ | ⋮ | ⋮ | ⋮ |

METHOD AND APPARATUS FOR CONVERTING FILM IMAGE INTO TV IMAGE

CROSS-REFERENCE TO RELATED APPLICATION

This application claims priority to Korean Patent Application No. 10-2012-0054939 filed on 23 May, 2012, and all the benefits accruing therefrom under 35 U.S.C. §119, the contents of which is incorporated by reference in its entirety.

BACKGROUND

1. Technical Field

The present invention relates to a method and apparatus for converting a film image (e.g., a movie) into a television (TV) image, and more particularly, to a method and apparatus for converting a film image into a TV image, which adds a pull-down field based on header information of a TV interface when BT601, BT656 and BT1120 are used as standards for the TV interface, thereby improving accuracy and reducing load of the apparatus when a film image is converted into a TV image.

2. Description of the Related Art

As is well-known to those skilled in the art, a film image must be converted into a TV image in order to display the film image of 24 frames per second (fps) on a TV. That is, a film image is converted into a TV image in order to show a movie on a TV.

One example of techniques for converting film images into TV images is disclosed in Korean Patent Publication Nos. 10-1994-8493A, 10-2004-23011A, etc.

In general, a TV image is transmitted as divided into an odd line image and an even line image, as shown in FIG. 1. The images transmitted as the odd line image and the even line image are combined into one image (i.e., a frame) and displayed at a receiver side.

Under the PAL/SECAM scheme, a TV image includes 25 fps and thus a 2:2 pull-down method wherein one pull-down field is inserted every 12 frames is employed. Under the NTSC scheme, the TV image includes 30 fps and thus a 3:2 pull-down method is employed.

The US and other countries employ a frequency of 60 Hz and transmit a 29.97 fps TV image. In order to use the film image as a video signal for the TV, 24 frame images must be converted into 30 frame images (accurately 29.97 frames) through the 3:2 pull-down method.

Therefore, in order to display the film image of 24 fps on the TV, every four film frames must be converted into five TV frames by the following calculation.

$$\frac{23.976}{29.97} = \frac{4}{5}$$

As shown in FIG. 1, frames consitituting a TV image include two images called fields. One image is an odd line image of the TV image, and the other image is an even line image of the TV image.

If every four frames constituting a movie (or film) image are respectively called A, B, C and D, the following conversion may be performed to display the film image on the TV.

That is, Frame A may be converted into three fields for the TV image. Further, Frame B may be converted into two fields for the TV image. Frame C may be converted into three fields for the TV image, and Frame D may be converted into two fields.

Such conversion may be written as "A-A-A-B-B-C-C-C-D-D" or "3-2-3-2" or simply "3-2". For this reason, conversion from the film image into the TV image is called "3:2 pull-down".

Then, the TV image fields are arranged as above with regard to every four frames of the film image. Accordingly, as shown in FIG. 1, the four frames of the film image are converted into five frames for the TV image.

However, such a conventional technique for converting frames of the film image into frames of the TV image has problems of imposing a load on the apparatus while lowering accuracy.

BRIEF SUMMARY

One aspect of the present invention is to provide a method and apparatus for converting a film image into a TV image, which uses header information of a transmitted film image signal when the film image signal is transmitted through BT601, BT656 and BT1120 used as standards for the TV interface.

In accordance with one aspect of the present invention, a method of converting a film image into a television (TV) image includes: receiving a film image; checking head information of the film image; and converting the film image into a TV image by a 3:2 pull-down method, based on the checked header information.

The converting the image may include, every four frames of the film image, the first operation of adding an odd field to the first frame among the four frames of the film image; the second operation of adding no field to the second frame among the four frames of the film image; the third operation of adding an even field to the third frame every four frames and changing a location of fields constituting the third frame; and the fourth operation of adding no field to the fourth frame every four frames and changing a location of fields constituting the fourth frame, and the first to fourth operations are repeated in sequence every four frames of the film image to generate the TV image.

The first, second, third and fourth frames every four frames of the film image may be checked using field information of the header information included in the film image.

The field information of the header information may have a value of 1 as an odd field or a value of 0 as an even field.

If an accumulated value of the field information is 4n (n=0, 1, 2, 3 . . . ), the first operation is performed; if the accumulated value of the field information is 4n+1 (n=0, 1, 2, 3 . . . ), the second operation is performed; if the accumulated value of the field information is 4n+2 (n=0, 1, 2, 3 . . . ), the third operation is performed; and if the accumulated value of the field information is 4n+3 (n=0, 1, 2, 3 . . . ), the fourth operation is performed.

In accordance with another aspect of the present invention, an apparatus for converting a film image into a television (TV) image includes: a film image reception unit which receives a film image; a header information checking unit which checks header information of the film image; and an image conversion unit which uses the header information checked by the header information checking unit to convert the film image into a TV image.

The image conversion unit may sequentially repeat, every four frames of the film image, the first operation of adding an odd field to the first frame among the four frames of the film image, the second operation of adding no field to the second frame among the four frames of the film image, the third operation of adding an even field to the third frame among the four frames of the film image and changing a location of fields constituting the third frame, and the fourth operation of adding no field to the fourth frame among the four frames of the film image and changing a location of fields constituting the fourth frame.

The image conversion unit may perform the first operation if an accumulated value of the field information is 4n (n=0, 1, 2, 3 . . . ), the second operation if the accumulated value of the field information is 4n+1 (n=0, 1, 2, 3 . . . ), the third operation if the accumulated value of the field information is 4n+2 (n=0, 1, 2, 3 . . . ), and the fourth operation if the accumulated value of the field information is 4n+3 (n=0, 1, 2, 3 . . . ).

BRIEF DESCRIPTION OF THE DRAWINGS

The above and other aspects, features, and advantages of the present invention will become apparent from the detailed description of the following embodiments in conjunction with the accompanying drawings, in which:

FIG. 2 is a view explaining an operation of an apparatus for converting a film image into a TV image according to one embodiment of the present invention;

FIG. 3 is a view explaining a method of checking header information according to one embodiment of the present invention;

FIGS. 6 and 7 are views explaining the method and apparatus for converting a film image into a TV image according to the embodiment of the present invention.

DETAILED DESCRIPTION

Figure 1:
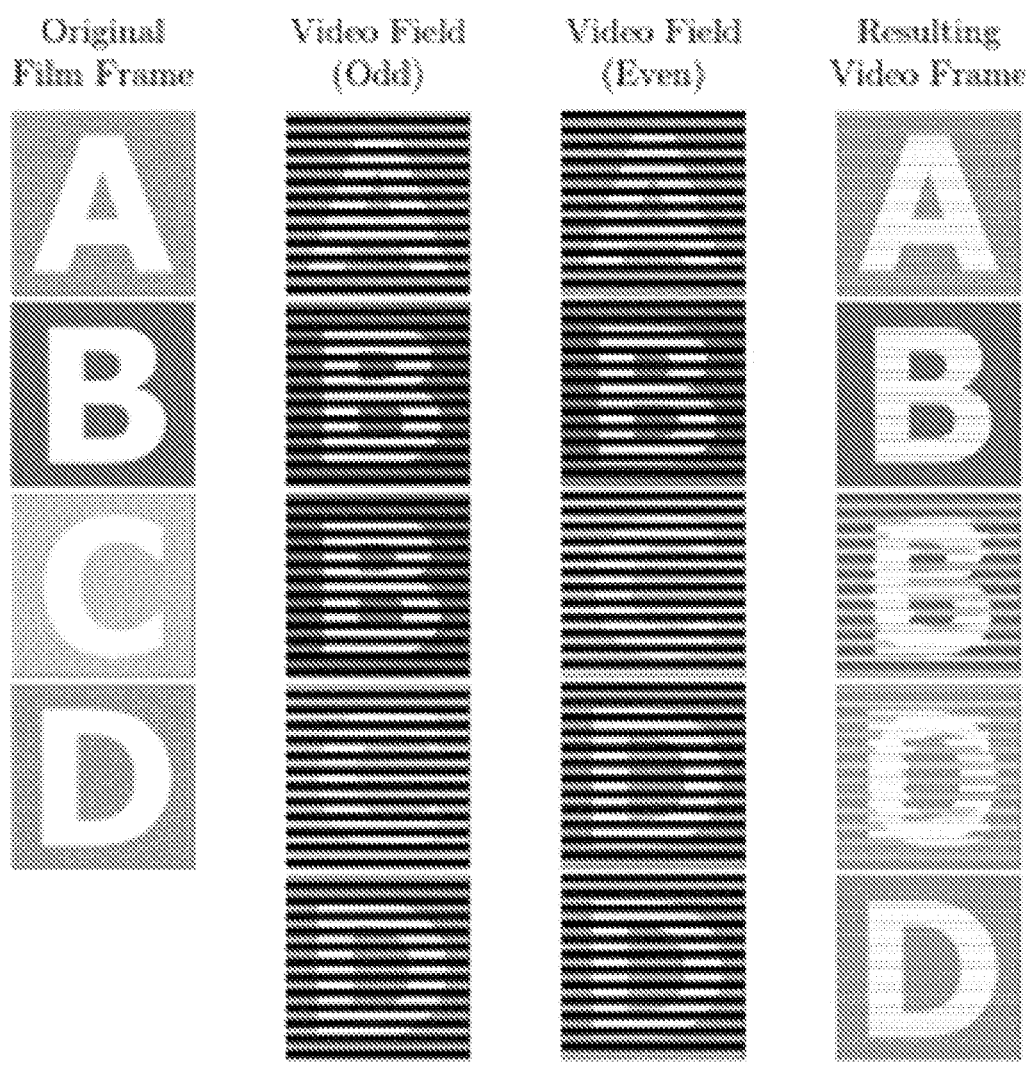
FIGS. 1 and 2 are views explaining a method of converting a film image into a TV image.

Exemplary embodiments of the present invention will now be described in detail with reference to the accompanying drawings. It should be understood that the present invention is not limited to the following embodiments and may be embodied in different ways, and that the embodiments are given to provide complete disclosure of the invention and to provide thorough understanding of the invention to those skilled in the art. Descriptions of details apparent to those skilled in the art will be omitted for clarity of description. The same components will be denoted by the same reference numerals throughout the specification.

Figure 2:
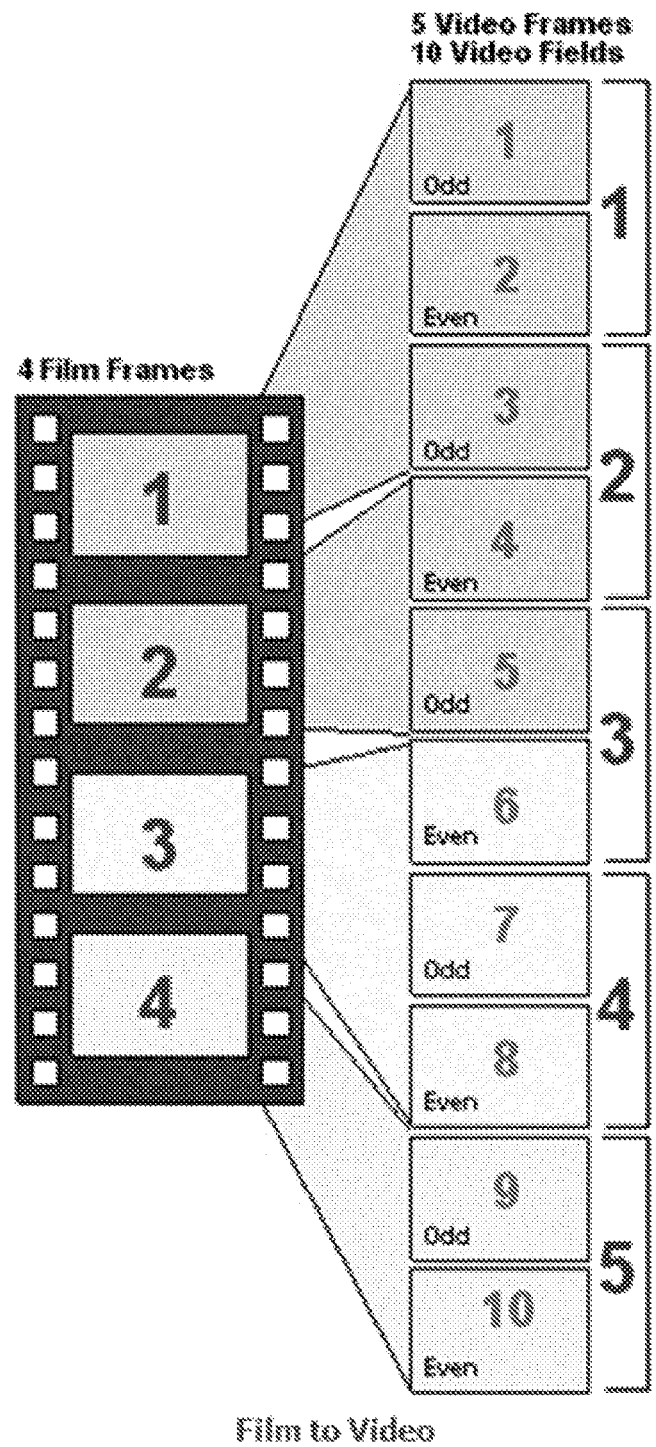
Figure 4:
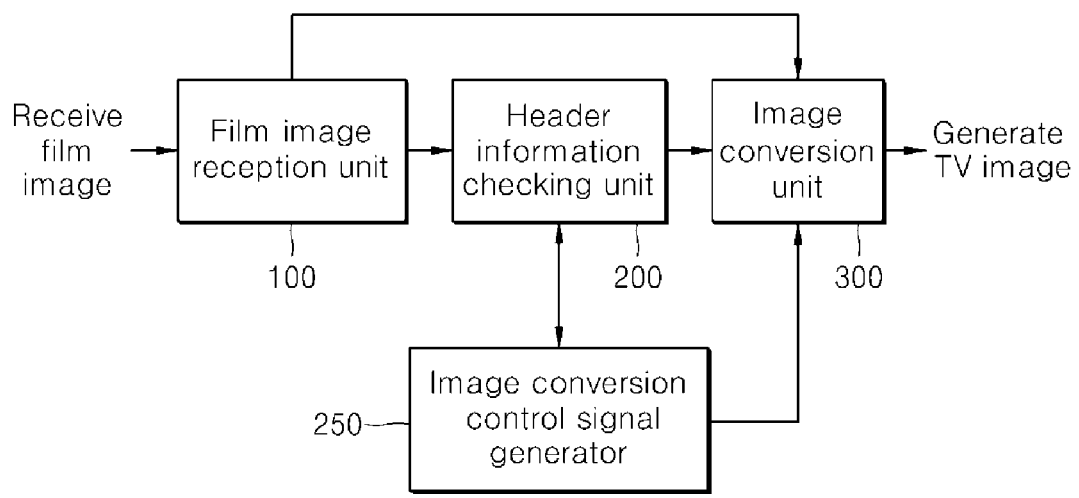
FIG. 4 is a block diagram of the apparatus for converting a film image into a TV image according to the embodiment of the present invention.
Figure 5A:
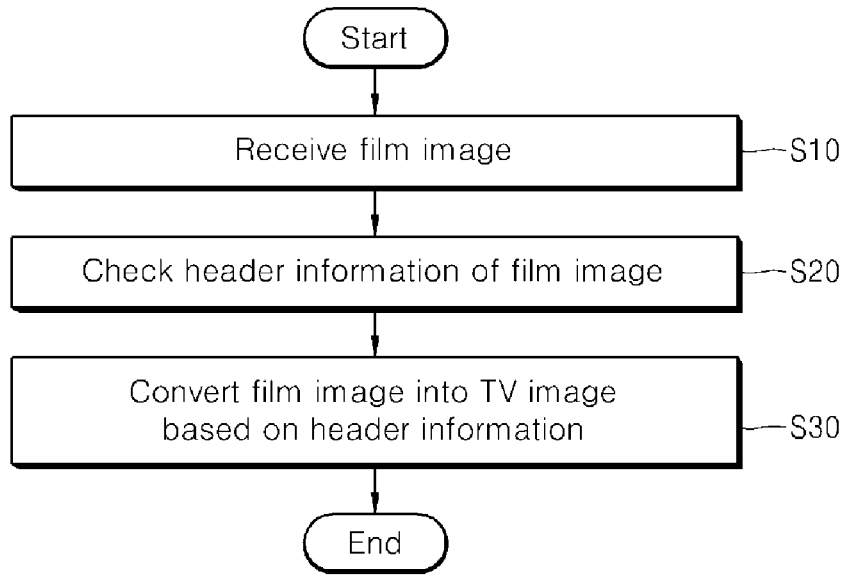
FIGS. 5a and 5b are flowcharts of the method of converting a film image into a TV image according to the embodiment of the present invention.
Figure 5B:
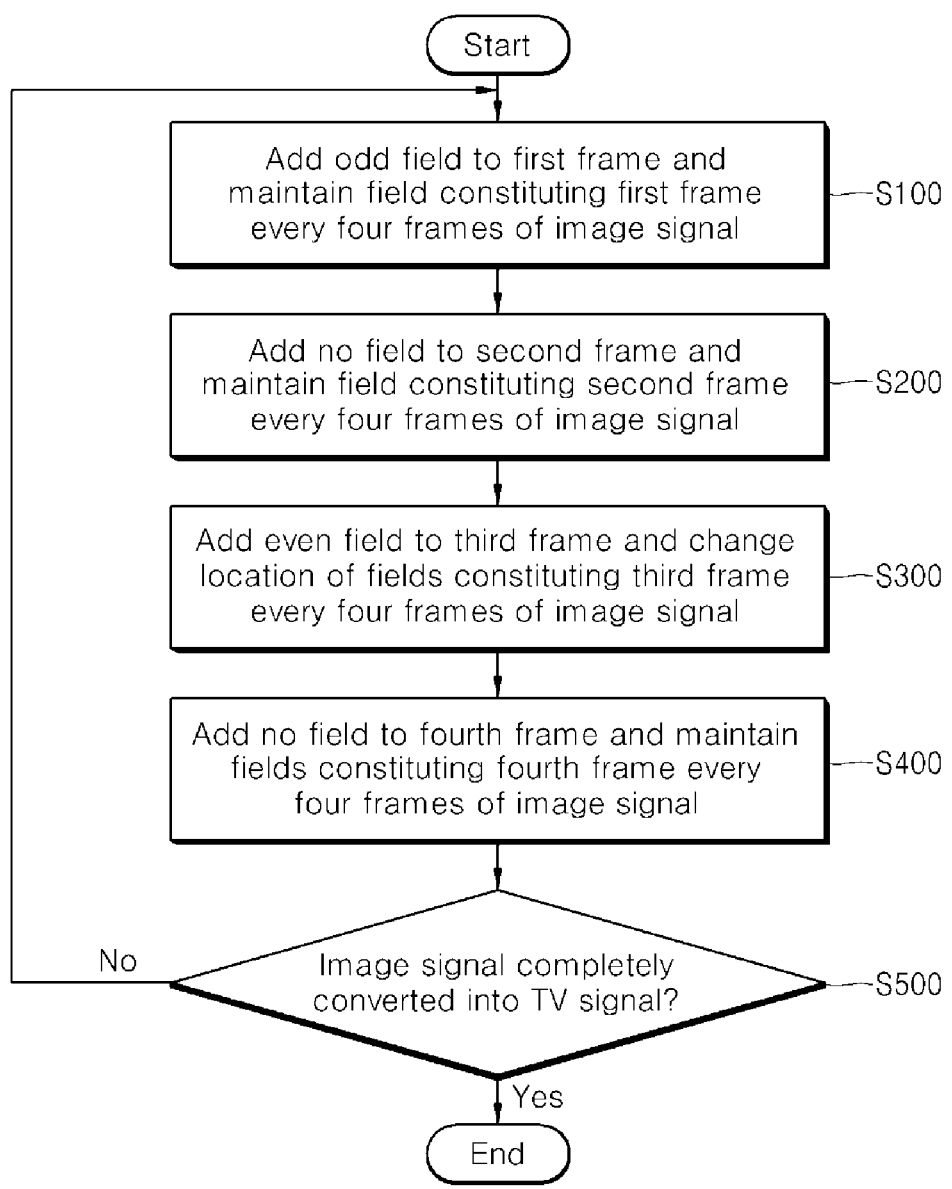

FIG. 2 is a view explaining an operation of an apparatus for converting a film image into a TV image according to one embodiment of the present invention, FIG. 3 is a view explaining a method of checking header information according to one embodiment of the present invention, FIG. 4 is a block diagram of the apparatus for converting a film image into a TV image according to the embodiment of the present invention, and FIGS. 5a and 5b are flowcharts of the method of converting a film image into a TV image according to the embodiment of the present invention.

Referring to FIGS. 4 and 5a, an apparatus for converting a film image into a TV image according to one embodiment includes a film image reception unit 100 to receive a film image (S10), and a header information checking unit 200 to check header information included in the film image (S20).

In addition, the apparatus may include an image conversion control signal generator 250 to generate a control signal to be used for converting a film image into a TV image based on the header information checked by the header information checking unit 200.

Further, the apparatus may include an image conversion unit 300 to convert a film image into a TV image based on the header information checked by the header information checking unit 200 (S30).

A film image applied to the present invention is as shown in the left sides of FIGS. 1 and 2.

A TV image into which the film image is converted according to the present invention is as shown in the right sides of FIGS. 1 and 2.

The film image reception unit 100 may receive a film image including header information through a predetermined TV interface. The header information checking unit 200 checks the header information included in the film image signal received by the film image reception unit 100.

That is, the header information checking unit 200 may receive information, such as header information, pixel data, etc., through a TV interface when BT601, BT656 and BT1120 are used as standards for the TV interface. Among these, as shown in FIG. 3, the information may include a field (F), a vertical blanking interval (V), a horizontal blanking interval (H), SAV, EAV, etc. Among these, a value of F is varied in the form of 0->1->0->1-> . . . , and this value may be input in a format as shown in FIG. 3 through a data interface.

According to the present invention, an accumulated value of F input as above is used. That is, the header information included in the film image may include field information, as shown in FIG. 7, that is, a field accumulated value. As described above, the field accumulated value is basically included in the header information.

The field accumulated value corresponds to a frame number of a film image, so that the header information checking unit 200 can easily check the field accumulated value through the frame number of the film image, and the like.

The image conversion control signal generator 250 may generate a signal for controlling the image conversion unit 300 described below through the header information, i.e., the field accumulated value checked by the header information checking unit 200.

The image conversion unit 300 uses the field accumulated value checked by the header information checking unit 200 to convert and generate a film image received by the film image reception unit 100 into a TV image, detailed operations of which are as follows.

Referring to FIGS. 4 to 7, every four frames of a film image received by the film image reception unit 100, the image conversion unit 300 adds an odd field to the first frame among every four frames in S100 (FIG. 5b).

The image conversion unit 300 does not add any field to the second frame among every four frames of the film image received by the film image reception unit 100 in S200.

The image conversion unit 300 adds an even field to the third frame among every four frames of the film image received by the film image reception unit 100, and changes a location of fields constituting the third frame in S300.

The image conversion unit 300 does not add any field to the fourth frame among every four frames of the film image received by the film image reception unit 100, and changes a location of fields constituting the fourth frame in S400.

As above, the fields are respectively added to the first frame and the third frame in order to convert the 24 fps film image into the 30 fps TV image, as shown in FIG. 2.

In the above embodiment, the odd field is first added and then the even field is added, but the present invention is not limited thereto. Alternatively, order of adding the field may be changed by taking design aspects into account. What field is added to which location may be arbitrarily changed according to design since one frame is added every four frames in order to convert the film image into the TV image. For example, the even field is first inserted into a proper location at which the even field will be placed, and then the odd field is inserted into a proper location at which the odd field will be placed.

Figure 6:
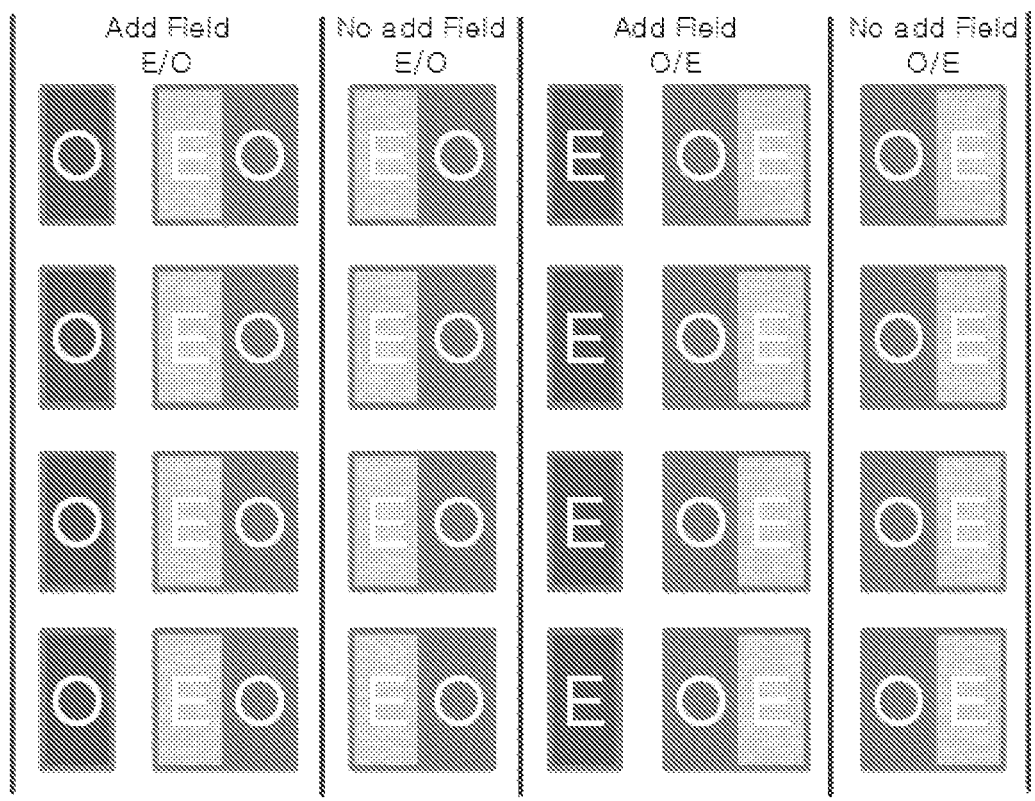

FIG. 6 shows a TV image converted and generated by the image conversion unit 300. Here, every four frames of the film image, there is no change in location of the even field (E)—the odd field (O) for the first frame and the second frame, and the original location of the even field (E)—the odd field (O) for the third frame and the fourth frame is changed into the odd field (O)—the even field (E).

As above, the location of the fields constituting the third frame and the fourth frame is changed by the image conversion unit 300 such that the fields can be arranged in the form of "O-E-O-E-O-E-O-E-O-E-O-E- . . . ", as shown in FIG. 2 even though the odd field is added to the first frame and the even field is added to the third frame.

In the foregoing embodiment, the fields are arranged in the form of "O-E-O-E-O-E-O-E-O-E- . . . ", but the present invention is not limited thereto. Alternatively, the fields may be arranged in the form of "E-O-E-O-E-O-E-O-E-O- . . . " in consideration of design aspects.

According to the present invention, the image conversion unit 300 uses the accumulated value of the field information as shown in FIG. 7 so as to add the odd field (O) to the first frame and add the even field (E) to the third frame, which will be described below.

As described above, the field accumulated value as shown in FIG. 7 is included in the header information of the film image.

The image conversion unit 300 may perform operation S100 of adding an odd field to the first frame if the accumulated value of the field information checked by the header information checking unit 200 is 4n (n=0, 1, 2, 3 . . . ). In operation S100, there is no change in location of the field constituting the first frame, as described above.

The image conversion unit 300 may perform operation S200 of adding no field to the second frame without changing the location of the field constituting the second frame if the accumulated value of the field information checked by the header information checking unit 200 is 4n+1 (n=0, 1, 2, 3 . . . ).

The image conversion unit 300 may perform operation S300 of adding an even field to the third frame while changing the location of the field constituting the third frame if the accumulated value of the field information checked by the header information checking unit 200 is 4n+2 (n=0, 1, 2, 3 . . . ).

The image conversion unit 300 may perform the operation S400 of adding no field to the fourth frame but changing the location of the field constituting the fourth frame if the accumulated value of the field information checked by the header information checking unit 200 is 4n+3 (n=0, 1, 2, 3 . . . ).

If the accumulated values of the field information are converted into binary numerals, they are changed as shown in FIG. 7. At this time, it will be appreciated that the image conversion unit 300 does not change the location of the field constituting the corresponding frame if a second digit of the binary numeral is 0, but changes the location of the field constituting the corresponding frame if a second digit of the binary numeral is 1.

Further, it will be appreciated that the image conversion unit 300 does not add a field to the corresponding frame if a first digit number of the binary numeral is 0, and adds a field to the corresponding frame if a first digit number of the binary numeral is 1.

That is, the image conversion unit 300 according to one embodiment of the invention employs the field accumulated value included in the header information of the field image to check and control whether to add the field to the corresponding frame and whether to change the location of the field constituting the corresponding frame, thereby improving accuracy of control information while reducing load in generation of the control information upon conversion of the film image into the TV image.

It will be appreciated that the method of converting a film image into a TV image may be realized by an automated process based on time-series order by a software program or the like embedded in a storage medium. Further, codes and code segments constituting the program can be easily conceived by computer programmers skilled in the art. In addition, the program stored in computer readable media is read and executed by a computer, thereby realizing the method. The information storage medium includes a magnetic recording medium, an optical recording medium, and a carrier wave medium.

In the method and apparatus according to the present invention, header information of a film image signal transmitted through a TV interface is used to perform pull-down conversion from the film image into a TV image, thereby improving accuracy of image conversion. Also, the header information of the film image signal is used to reduce computational load of the apparatus.

Although some exemplary embodiments have been described herein, it should be understood by those skilled in the art that these embodiments are given by way of illustration only, and that various modifications, variations and alterations can be made without departing from the spirit and scope of the invention. The scope of the present invention should be defined by the appended claims and equivalents thereof.

What is claimed is:

1. A method of converting a film image into a television (TV) image, the method comprising:
    receiving a film image;
    checking field information included in header information of the film image; and
    converting the film image into the TV image by a 3:2 pull-down method, based on the checked field information,
    wherein the converting the image comprises, every four frames of the film image,
    the first operation of adding an odd field to the first frame among the four frames of the film image, when an accumulated value of the field information is 4n (n=0, 1, 2, 3 . . . );
    the second operation of adding no field to the second frame among the four frames of the film image, when an accumulated value of the field information is 4n+1 (n=0, 1, 2, 3 . . . );
    the third operation of adding an even field to the third frame every four frames and changing a location of fields constituting the third frame, when an accumulated value of the field information is 4n+2 (n=0, 1, 2, 3 . . . ), and
    the fourth operation of adding no field to the fourth frame every four frames and changing a location of fields constituting the fourth frame, when an accumulated value of the field information is 4n+3 (n=0, 1, 2, 3 . . . ), and wherein the first to fourth operations are repeated in sequence every four frames of the film image.

2. The method according to claim 1, wherein the first, second, third and fourth frames every four frames of the film image are checked using field information of the header information included in the film image.

3. The method according to claim 2, wherein the field information of the header information has a value of 1 as an odd field or a value of 0 as an even field.

4. An apparatus for converting a film image into a television (TV) image, the apparatus comprising:
   a film image reception unit which receives a film image;
   a header information checking unit which checks field information included in header information of the film image; and
   an image conversion unit which uses the field information checked by the header information checking unit to convert the film image into the TV image,
   wherein the image conversion unit sequentially repeats, every four frames of the film image,
   the first operation of adding an odd field to the first frame among the four frames of the film image, when an accumulated value of the field information is $4n$ ($n=0, 1, 2, 3 \ldots$);
   the second operation of adding no field to the second frame among the four frames of the film image, when an accumulated value of the field information is $4n+1$ ($n=0, 1, 2, 3 \ldots$);
   the third operation of adding an even field to the third frame every four frames and changing a location of fields constituting the third frame, when an accumulated value of the field information is $4n+2$ ($n=0, 1, 2, 3 \ldots$); and
   the fourth operation of adding no field to the fourth frame every four frames and changing a location of fields constituting the fourth frame, when an accumulated value of the field information is $4n+3$ ($n=0, 1, 2, 3 \ldots$), and
   wherein the first to fourth operations are repeated in sequence every four frames of the film image.

5. The apparatus according to claim 4, wherein the image conversion unit checks the first, second, third and fourth frames every four frames of the film image using field information of the header information included in the film image.

6. The apparatus according to claim 5, wherein the field information of the header information has a value of 1 as an odd field or a value of 0 as an even field.

* * * * *